United States Patent
Lyons et al.

(10) Patent No.: US 6,196,345 B1
(45) Date of Patent: Mar. 6, 2001

(54) DRIVE-LINE DAMPING CONTROL FOR AN ELECTRIC VEHICLE

(75) Inventors: Arthur Paull Lyons, Maine; Slobodan Gataric, Vestal, both of NY (US)

(73) Assignee: Bae Systems Controls, Inc., Johnson City, NY (US)

(*) Notice: Subject to any disclaimer, the term of this patent is extended or adjusted under 35 U.S.C. 154(b) by 0 days.

(21) Appl. No.: 09/080,148

(22) Filed: May 18, 1998

(51) Int. Cl.[7] .................................................. B60K 1/00
(52) U.S. Cl. .......................................... 180/65.8; 180/65.6
(58) Field of Search ................................ 180/65.1, 65.6, 180/65.7, 65.8; 318/432, 433, 630

(56) References Cited

U.S. PATENT DOCUMENTS

| | | | |
|---|---|---|---|
| 1,017,198 | * | 2/1912 | Bender .......................... 180/65.1 X |
| 3,184,662 | * | 5/1965 | Wallace ........................... 318/630 X |
| 5,349,278 | * | 9/1994 | Wedeen ........................... 318/432 X |
| 5,404,418 | * | 4/1995 | Nagano . |
| 5,545,957 | * | 8/1996 | Kubo et al. ........................ 318/432 |
| 5,729,111 | * | 3/1998 | Ogura et al. ................... 318/432 X |
| 5,773,938 | * | 6/1998 | Seong et al. . |
| 5,784,742 | * | 7/1998 | Giuliani et al. . |
| 5,785,191 | * | 7/1998 | Feddema et al. . |
| 5,821,720 | * | 10/1998 | Deng et al. ..................... 180/65.6 X |

OTHER PUBLICATIONS

Infinite Impulse Response Filters (http://svr–www.eng.com.ac.uk/), Oct. 13, 1999*
11R Filters (http://www.bores.com/), Oct. 13, 1999.*

* cited by examiner

Primary Examiner—Brian L. Johnson
Assistant Examiner—Bryan Fischmann
(74) Attorney, Agent, or Firm—W. H. Meise; G. H. Krauss

(57) ABSTRACT

An electric motor vehicle includes an electric motor driving a step-down differential, axles, and drive wheels. An operator control produces torque command signals, which are applied to a controller to command application of electric power to the motor in response to the torque commands, to achieve the desired torque. The low friction of the electric drive, in conjunction with the rotational compliance or imperfect stiffness of the axles, may result in low-frequency surges or jerky motion, especially at low speeds. A damping arrangement includes a differencing circuit coupled between the operator control and the controller, for taking the difference between the operator-commanded torque and a damping torque signal. The damping torque signal is produced by differentiating the electric motor speed to produce a motor-acceleration representative signal.

5 Claims, 3 Drawing Sheets

DRIVE-LINE DAMPING CONTROL FOR AN ELECTRIC VEHICLE

FIELD OF THE INVENTION

This invention relates to electrically driven vehicles, and more particularly to such vehicles in which an axle shaft connects the electric motor to a drive wheel.

BACKGROUND OF THE INVENTION

Electric vehicles are coming into increasing importance because of their supposedly low environmental impact. When a heavyweight vehicle such as a truck or bus is fitted with an electric drivetrain driving the drive wheels through a speed reducing differential and one or more axles, it has been found that acceleration from low speeds is not smooth. Analysis of the perturbations in acceleration have shown that the stiffness of the axle shafts which couple torque to the drive wheels is such that the axle tends to twist, which, in conjunction with the very low friction of the electric drive train, results in oscillations of the vehicle speed.

Smoothly accelerating electric vehicles are desired.

SUMMARY OF THE INVENTION

A motor vehicle according to an aspect of the invention includes a source of electric energy, and an electric motor including an output shaft. The vehicle also includes a control which is a source of operator-controlled commanded torque signals. A control system is coupled to the source of electric energy, to the electric motor, and to receive torque command signals, for controlling the motor to produce the commanded torque at the output shaft of the motor. The vehicle further includes a mechanical gearbox including an input shaft coupled to the shaft of the motor and also includes an output shaft. The gearbox reduces the input shaft speed to produce a lower output shaft speed, with a concomitant increase in the output shaft torque. A drive wheel supports and drives the vehicle. An elongated axle shaft is coupled to the drive wheel and to the output shaft of the gearbox, for thereby coupling torque to the drive wheel from the gearbox. The axle shaft has a stiffness which, in conjunction with the mass of the vehicle, tends to produce undesired jerky motion of the vehicle. A motor speed sensor produces signals representative of the speed of the motor. A differencing arrangement includes a noninverting input port coupled to the source of operator-controlled commanded torque signals, and also includes an inverting input port, for subtracting signals applied to the inverting input port of the differencing arrangement from the commanded torque signals, for generating the torque command signals. A damping signal generator is coupled to the motor speed sensor and to the inverting input port of the differencing arrangement, for coupling to the inverting input port of the differencing arrangement at least the low-frequency components of motor acceleration.

In a particular embodiment of the invention, the gearbox is a differential including a second output shaft, and the vehicle further comprises a second drive wheel, and a second axle coupling the second drive wheel to the second output shaft of the differential.

The damping signal generator may include an infinite-impulse-response transversal filter including an input port coupled to the motor speed sensor, for receiving the motor speed signals, for generating the damping signals.

The infinite-impulse-response filter may include a delay stage including an input node coupled to receive the motor speed signals, and also including an output port at which delayed motor speed signals appear. A first summing circuit including an inverting input port and a noninverting input port, and an output port at which the difference between the signals applied to the inverting and noninverting input ports is generated. A second summing circuit includes an inverting input port, and also includes a noninverting input port coupled to the output port of the first summing circuit. The second summing circuit further includes an output port at which the damping signals are generated. A first multiplier is coupled to the input node of the delay stage and to the noninverting input port of the first summing circuit, for coupling the motor speed signals from the node to the noninverting input port of the first summing circuit with at particular gain. A second multiplier is coupled to the output port of the delay stage and to the inverting input port of the second summing circuit, for coupling the delayed motor speed signals from the output port of the delay stage to the inverting input port of the second summing circuit with a second gain. The second gain may equal the particular gain. A feedback path is coupled to the output port of the second summing circuit and to the inverting input port of the first summing circuit. The feedback path includes a delay stage and a third multiplier for multiplying feedback signals traversing the feedback path by a third gain.

DESCRIPTION OF THE INVENTION

Figure 1:
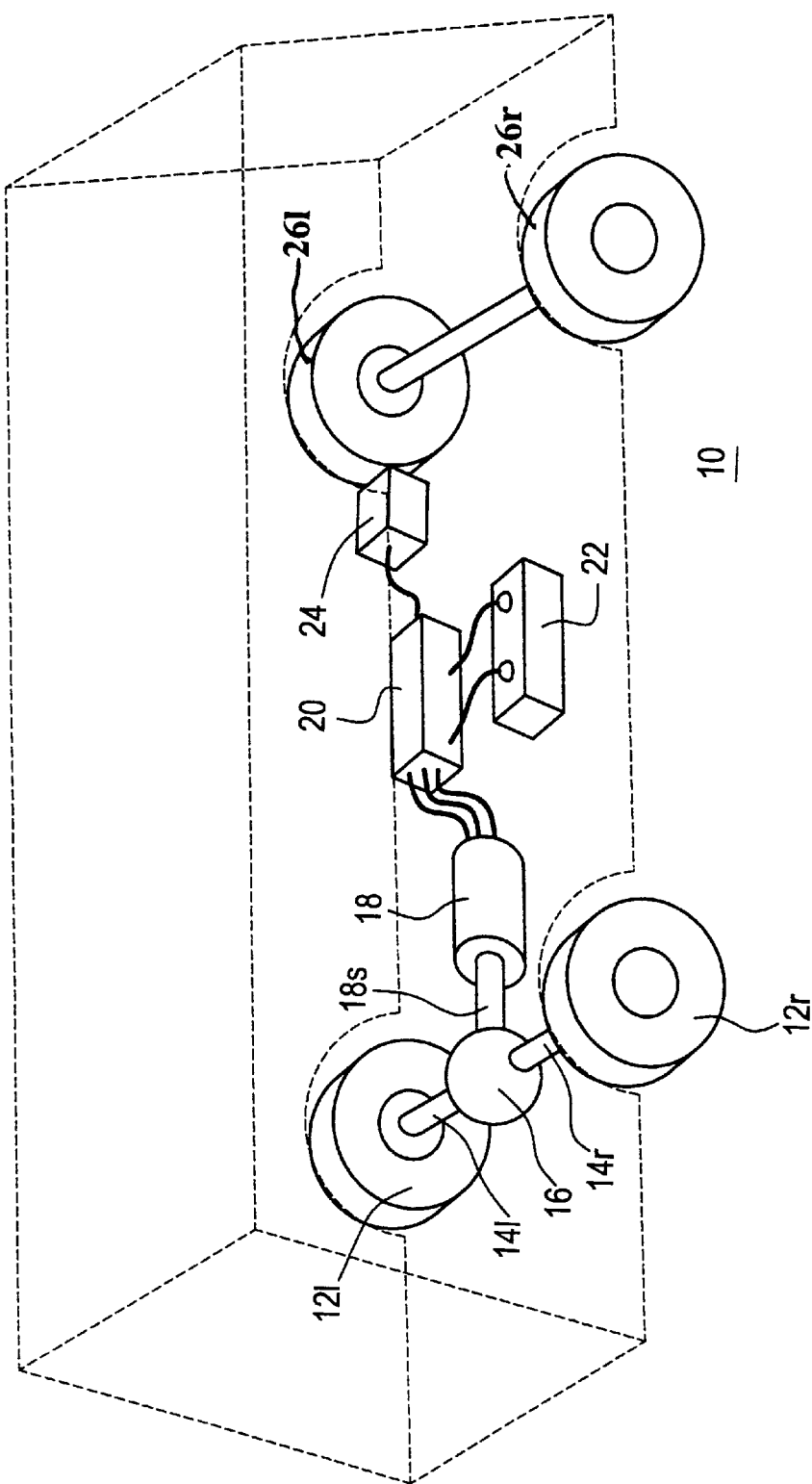
FIG. 1 is a simplified representation of an electric vehicle according to an aspect of the invention.

In FIG. 1, a vehicle 10 includes a pair of drive wheels 12*l*, 12*r*, which are attached to axle shafts 14*l*, 14*r*. Axle shafts 14 are connected to shafts of a speed-reducing differential 16, which receives torque from the output shaft 18*s* of an electric motor 18. Motor 18 receives electrical drive from a controller illustrated as a box 20, which includes a control system, such as that described in U.S. patent application No. 09/039,895, filed Mar. 16, 1998 in the name of Gataric et al. Controller 20 receives electrical power from a battery 22, and produces control signals for the motor in response to command torque signals produced by an operator control, illustrated as a box 24. For completeness, vehicle 10 is also illustrated as having front wheels 26*l*, 26*r*.

Figure 2:
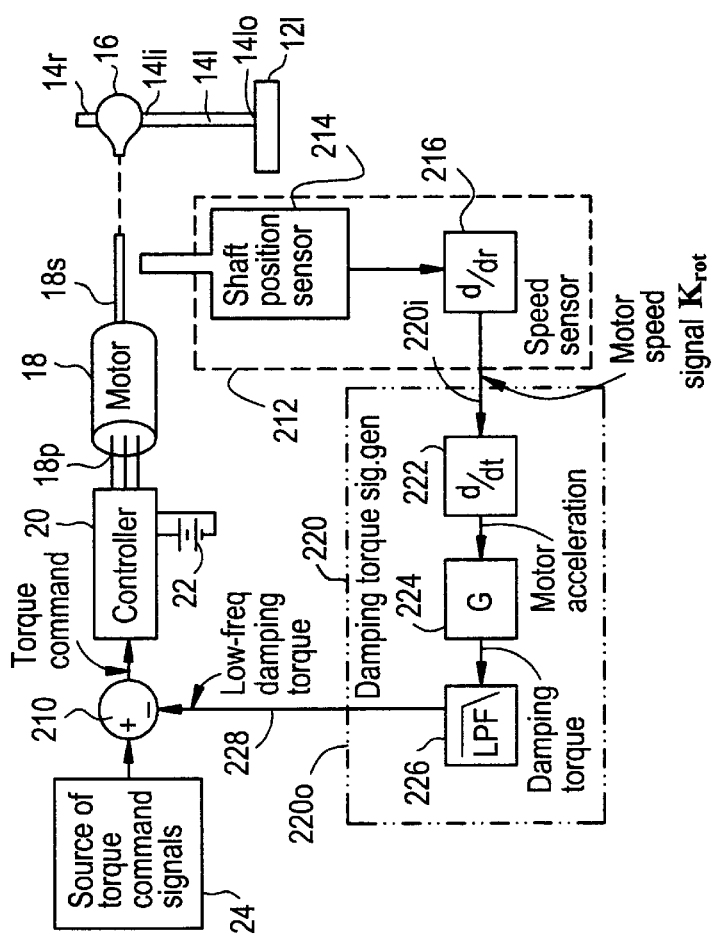
FIG. 2 is a simplified block diagram including control portions of the vehicle of FIG. 1.

FIG. 2 is a simplified block diagram of a vehicle according to an aspect of the invention. In FIG. 2, elements corresponding to those of FIG. 1 are designated by like reference numbers. In FIG. 2, the signals representing the desired torque which are generated by operator control 24 are applied to the noninverting input port of a differencing or error signal generating circuit 210. Differencing circuit 210 also includes an inverting input port. Differencing circuit 210 subtracts low-frequency components of the damping torque signal applied to its inverting input port from the commanded torque signals applied to its noninverting input port, to thereby generate torque command signals for application to controller 20. Controller 20 processes the torque command signals applied thereto in accordance with its control laws, and produces controlled electrical power, which is applied to the electrical input ports 18p of motor 18. Motor 18 produces the commanded torque.

As mentioned, the stiffness of the axle shafts, in the low-friction environment of electric drive, results in unwanted low-rate variations in vehicle speed. In accordance with the invention, the motor speed is sensed, and a damping torque signal generator generates damping torque signals which are summed with the commanded torque signals, to thereby generate corrected torque command signals which counter the effects of the unwanted variations in speed.

More particularly, a motor speed signal generator 212 in FIG. 2 includes a shaft position sensor 214 and a differentiator 216, which differentiates the shaft position signals from position sensor 214, to thereby generate motor speed signals. The motor speed signals are applied from motor speed sensor 212 to a damping torque signal generator 220, which produces low-frequency components of damping torque signals on a signal path 228, and applies the signals to the inverting input port of differencing circuit 210. Within damping torque signal generator 220, a differentiator 222 differentiates the motor speed signals from speed sensor block 212, to produce signals related to the motor acceleration. The motor acceleration signals are applied to a gain block 224, where they are multiplied by a constant G to produce damping torque related signals. The damping torque related signals are limited in a low-pass filter 226 to a low frequency, which, for example, may be less than ten Hertz, to produce the low-frequency components of the damping torque on signal path 228. In operation of the vehicle, the low-frequency damping torque signals, when subtracted from the commanded torque, produce torque command signals which, when modified by the control laws of controller 20, command the motor with a varying torque which offsets the torque variations caused by the resonant elements including the axle shafts 14*l* and 14*r*.

For purposes of explaining the problem which was discovered in the operation of a vehicle, and the nature of the invention in solving the problem, the fact that there are two axles and wheels on the vehicle may be ignored, and they are treated as one. On the other hand, it is necessary to define the two ends of the axle, which are for simplicity denominated the inboard end and the outboard end. The inboard end of axle shaft 14*l* is illustrated in FIG. 2 as 14*li*, and is coupled to one of the shafts (not separately illustrated) of differential 16. The outboard end of axle shaft 14*l* is adjacent drive wheel 12*l*, and is designated 14*lo*.

Figure 3:
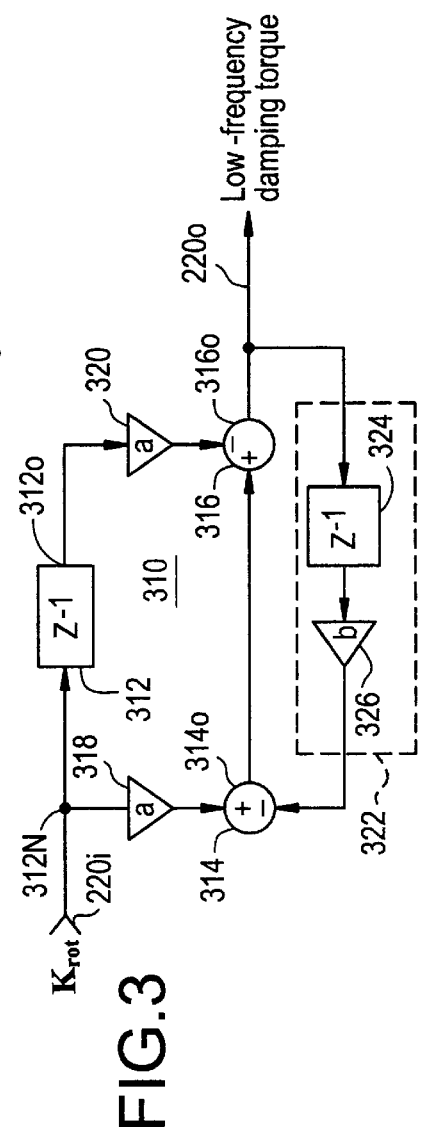
FIG. 3 is an analytic representation of the dynamics of the control and driving system of the vehicle of FIG. 1.

FIG. 3 is a simplified block diagram of an implementation of damping circuit 220 of FIG. 2. In FIG. 3, the motor rotational speed signal $\kappa_{rot}$ is applied to the input port 220*i* of the damping circuit 220, from which it is applied to an input node 312N of an infinite-impulse response (IIR) transversal filter designated generally as 310. Filter 310 of FIG. 3 includes a one-clock-cycle delay or $Z^{-1}$ element 312, which receives the motor rotational speed signal $\kappa_{rot}$ from node 312N, and delays it, to thereby produce delayed motor rotational speed signal $\kappa_{rot}$ at its output port 312*o*. A first summing circuit 314 has both inverting and noninverting input ports, and also includes a sum or output port which is coupled to the noninverting input port of a second summing circuit 316. A first multiplier or gain element 318 multiplies the motor rotational speed signal $\kappa_{rot}$ from node 312N by a predetermined value, represented as the value "a," and applies the multiplied signal to the noninverting input port of first summing circuit 314. First summing circuit 314 subtracts the value of signal applied to its inverting input port from the value of the multiplied signal applied to the noninverting input port, and couples the resulting output signal to the noninverting input port of second summing circuit 316.

In FIG. 3, the delayed motor rotational speed signal $\kappa_{rot}$ at output port 312*o* of delay element 312 is multiplied by a second multiplier or gain element 320 by a predetermined value, which in this example is the same value "a". The delayed and multiplied signal appearing at the output port of multiplier or gain element 320 is applied to the inverting input port of summing circuit 316. As mentioned, summing circuit 316 subtracts the value of the signal applied to its inverting input port from the value applied to its noninverting input port. The resulting difference signal appears at output port 316*o*, and corresponds to the low frequency components of the damping torque signal which are applied by damping signal generator 220 to path 228 of FIG. 2. A feedback signal path designated generally as 322 is coupled between output port 316*o* of summing circuit 316 and the inverting input port of summing circuit 314. Feedback signal path 322 includes a unit delay element 324 cascaded with a multiplier or gain element 326, which multiplies the delayed signal by a value, designated as "b" in FIG. 3. The structure represented by FIG. 3 corresponds to the software which implements one embodiment of the invention.

Figure 4:
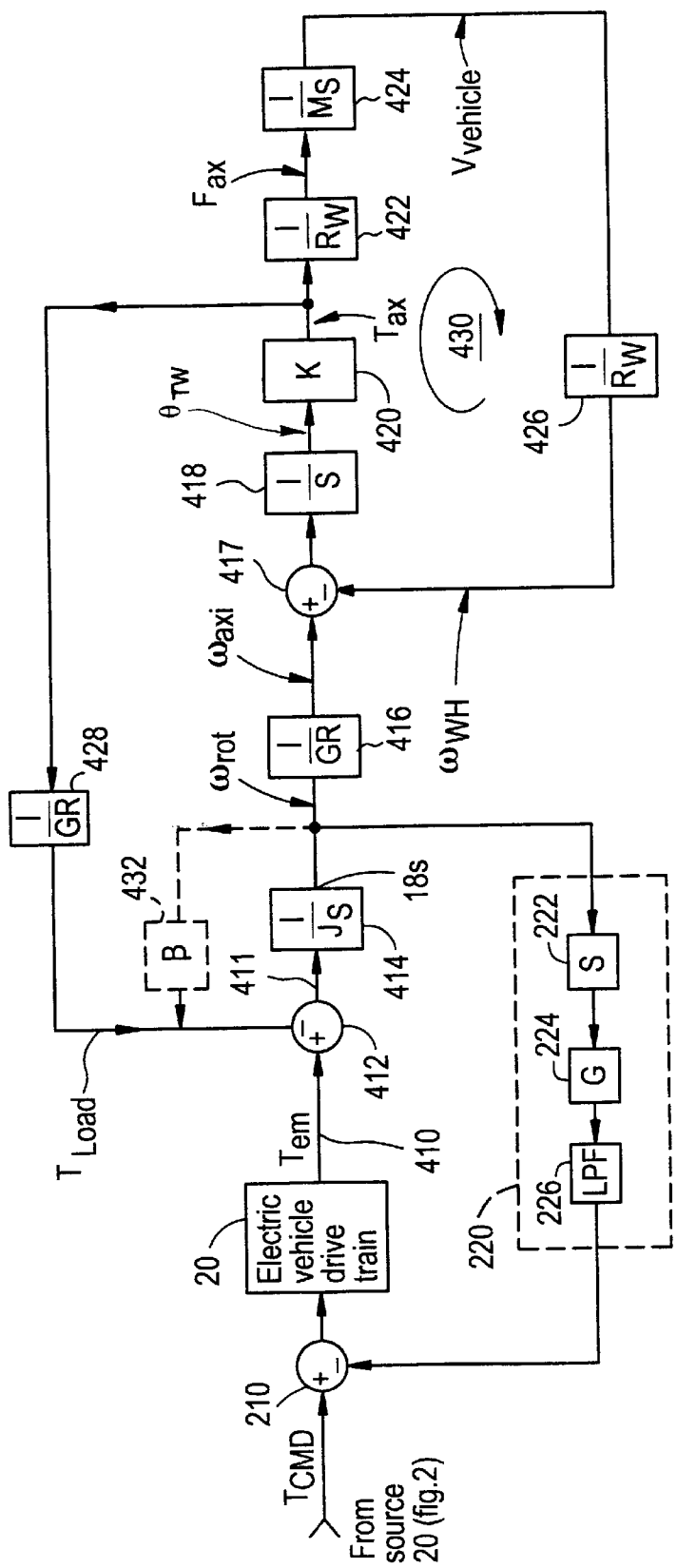
FIG. 4 is a more detailed block diagram of a particular embodiment of a damping signal generator of the arrangement of FIG. 1.

FIG. 4 is a simplified block diagram expressing the characteristics of the various parts of the vehicle, and their interrelationship. In FIG. 4, the commanded torque signals from source 20 are applied through differencing circuit 210 to the electric vehicle drive train 20, which includes the controller and the motor. The drive train 20 produces, on a path illustrated as 410, mechanical torque $T_{em}$ representing the electric motor torque. The difference between the motor torque and the load torque $T_{load}$ is produced by means of the differencing block designated 412, and the difference appearing on signal path 411 represents the torque applied at the motor output shaft. The motor shaft speed $\omega_{rot}$ resulting from the net torque at the motor shaft is determined by 1/Js, where J represents the inertia of the rotor of the motor and the motor shaft, and 1/s represents integration.

In FIG. 4, the rotational speed $\omega_{rot}$ of the motor shaft is applied to a block 416, representing the gear step-down ratio GR of the differential 16 of FIG. 1, which reduces the rotational speed or rate from $\omega_{rot}$ to $\omega_{axi}$ at the inboard end 14*li* of the axle 14*l*. The rotation of the inboard end 14*li* of axle shaft 14*l*, does not, because of the lack of stiffness of the axle shaft, result in immediate rotation of the outboard end of the shaft. Instead, over time (as represented by integrator 418), the difference, generated by differencing block 417, between the rotational speed of the inboard end 14*li* of the axle shaft ($\omega_{axi}$) and the rotational speed of the outboard end of the axle (the wheel speed $\omega_{wh}$) results in a change in the twist angle $\theta_{tw}$ of the axle at the output of a block 418 representing integration. The twist angle $\theta_{tw}$, when multiplied in block 420 by the stiffness K of the axle shaft, results in a torque $T_{ax}$ at both ends of the axle shaft 14*l*. The axle torque $T_{ax}$ becomes a linear force $F_{ax}$ when multiplied in a block 422 by a factor $1/R_{wheel}$ related to the radius of the drive wheel 12*l*. The linear force $F_{ax}$, when multiplied in block 424 by a factor 1/Ms, where M is the mass of the vehicle, and 1/s is an integration, results in vehicle speed $V_{vehicle}$.

The velocity $V_{vehicle}$ of the vehicle, as represented in FIG. 4 at the output of block 424, when multiplied by a factor $1/R_{wheel}$ in feedback block 426, produces the rotational wheel speed $\omega_{wh}$ which is subtracted from the inboard axle speed in differencing block 417.

The axle torque $T_{ax}$ appearing at the output of block 420 of FIG. 4 is transformed through the gearing of the differential 16 to produce a transformed torque $T_{load}$, which is fed back to summer 412 for subtraction from the motor torque.

The oscillation, toward the reduction of which the invention is directed, arises from the loop 430 of FIG. 4, including blocks 417, 418, 420, 422, 424, and 426. Friction is not modeled in FIG. 4, because its value is so low in the electric power train, at least in part because of the lack of the moving crankshaft, pistons, and the like of an internal combustion engine, and more notably because of lack of a shiftable transmission, which is a major contributor to friction, and therefore to damping. Thus, lack of a shiftable transmission may make unstable a drive train which would be stable in the presence of such a transmission.

Friction B, were it large enough to model in FIG. 4, would be represented as a phantom-line block 432 connecting the output of block 414 to a further inverting input port of differencing block 412. The friction represented by block 432, were it large enough to provide damping, would feed back a component of torque to tend to overcome the oscillatory component of torque flowing through block 428.

The improvement provided by the damping torque signal generator 220 or FIGS. 2 and 4 functions by sampling the rotational speed $\kappa_{rot}$ at the output of the motor, and feeding back to the inverting input port of block 210 a component of motor acceleration which, when transformed through the electric vehicle drive train 20 to path 410, provides a damping signal which would be provided by block 432, were there enough friction to provide damping. More particularly, the derivative block 222 artificially provides equivalent inertia J.

The oscillatory variation in speed affects the values of all the variables in loop 430 of FIG. 4. Thus, the oscillation tends to vary the value of axle torque $T_{ax}$. This variation in axle torque is coupled through block 428. If at a particular moment the varying value of axle torque is increasing, the load torque $T_{load}$ at summing point 412 also increases. Summing point 412 subtracts the increasing value of axle torque from the electric motor torque $T_{em}$, to produce a decreasing value of torque at the output of summing point 412. This decreasing value of torque at the output of summing point 412 flows through the inertia of the rotor and rotor shaft represented by block 414, to produce a decreasing value of rotational speed $K_{axi}$. The decreasing value of rotational speed returns by way of block 416 to loop 430 to maintain the oscillation, and is also coupled to differentiator 222 of damping signal generator 220. The differentiator generates a negative signal from the decreasing shaft speed $K_{rotor}$. The negative signal from differentiator 222 is amplified and low-pass-filtered, which do not affect the sign of the signal. The negative damping signal is applied from LPF 226 to summing circuit 210, where the negative value is subtracted from the commanded torque. Subtraction of a negative value increases the commanded torque at the output of summing circuit 210. The increased commanded torque flows through the drive train represented by block 20, and appears as an increased motor torque on path 410. The increased motor torque on path 410, when with the increasing load torque, results in a substantially constant value of net torque at the input of block 414, notwithstanding the oscillatory nature of loop 430. The breaking of the variation of feedback due to the oscillation stabilizes the entire vehicle control system.

Other embodiments of the invention will be apparent to those skilled in the art. For example, the disclosed control system may be implemented as hardware, firmware, or software, but software is preferred where possible.

Thus, a motor vehicle (10) according to the invention includes a source (22) of electric energy, and an electric motor (18) including an output shaft (18s). The vehicle (10) also includes a control which is a source (24) of operator-controlled commanded torque signals. A control system (20) is coupled to the source (22) of electric energy, to the electric motor (18), and to receive torque command signals, for controlling the motor (18) to produce the commanded torque at the output shaft of the motor (18). The vehicle (10) further includes a mechanical gearbox (16) including an input shaft coupled to the shaft (18s) of the motor (18) and also includes an output shaft. The gearbox reduces the input shaft speed to produce a lower output shaft speed, with a concomitant increase in the output shaft torque. A drive wheel (12*l*) supports and drives the vehicle (10). An elongated axle shaft (14*l*, 14*r*) is coupled to the drive wheel (12*l*, 12*r*) and to the output shaft of the gearbox (16), for thereby coupling torque to the drive wheel (12*l*, 12*r*) from the gearbox (16). The axle shaft has a stiffness which, in conjunction with the mass of the vehicle (10), tends to produce undesired jerky motion of the vehicle (10). A motor (18) speed sensor produces signals representative of the speed of the motor (18). A differencing arrangement (210) includes a noninverting (+) input port coupled to the source (24) of operator-controlled commanded torque signals, and also includes an inverting (−) input port, for subtracting signals applied to the inverting (−) input port of the differencing arrangement (210) from the commanded torque signals, for generating the torque command signals. A damping signal generator (220) is coupled to the motor (18) speed sensor (212) and to the inverting (−) input port of the differencing arrangement (210), for coupling to the inverting (−) input port of the differencing arrangement (210) at least the low-frequency components of motor (18) acceleration.

In a particular embodiment of the invention, the gearbox (16) is a differential (16) including a second output shaft, and the vehicle (10) further comprises a second drive wheel (12*r*), and a second axle (14*r*) coupling the second drive wheel (12*r*) to the second output shaft of the differential (16).

The damping signal generator (220) may include an infinite-impulse-response (IIR) transversal filter (310) including an input port (220*i*) coupled to the motor (18) speed sensor (212), for receiving the motor (18) speed signals, for generating the damping signals.

The infinite-impulse-response filter (310) may include a delay stage (312) including an input node (312N) coupled to receive the motor (18) speed signals, and also including an output port (312*o*) at which delayed motor (18) speed signals appear. A first summing circuit (314) including an inverting (−) input port and a noninverting (+) input port, and an output port (314*o*) at which the difference between the signals applied to the inverting and noninverting input ports is generated. A second summing circuit (316) includes an inverting (−) input port, and also includes a noninverting (+) input port coupled to the output port (314*o*) of the first summing circuit (314). The second summing circuit (316) further includes an output port (316*o*) at which the damping signals are generated. A first multiplier (318) is coupled to the input node (312N) of the delay stage (312) and to the noninverting (+) input port of the first summing circuit (314), for coupling the motor (18) speed signals from the node (312N) to the noninverting (+) input port of the first summing circuit (314) with a particular gain (a). A second multiplier (320) is coupled to the output port (312*o*) of the delay stage (312) and to the inverting (−) input port of the second summing circuit (316), for coupling the delayed motor (18) speed signals from the output port (312o) of the delay stage (312) to the inverting (−) input port of the second summing circuit (316) with a second gain (a). The second gain may equal the particular gain. A feedback path (322) is coupled to the output port (316o) of the second summing circuit (316) and to the inverting (−) input port of the first summing circuit (314). The feedback path (322) includes a delay stage (324) and a third multiplier (326) for multiplying feedback signals traversing the feedback path (322) by a third gain (b).

What is claimed is:

1. A motor vehicle, comprising:
    a source of electric energy;
    an electric motor including an output shaft;
    a source of operator-controlled commanded torque signals;
    a control system coupled to said source of electric energy, to said electric motor, and to receive torque command signals, for controlling said motor to produce the commanded torque at said output shaft of said motor;
    a mechanical gearbox including an input shaft coupled to said shaft of said motor and also including an output shaft, for reducing the input shaft speed to produce a lower output shaft speed, with a concomitant increase in the output shaft torque;
    a drive wheel for supporting and driving said vehicle;
    an elongated axle shaft coupled to said drive wheel and to said output shaft of said gearbox, for thereby coupling torque to said drive wheel from said gearbox, said axle shaft having a stiffness which, in conjunction with the mass of said vehicle, tends to produce undesired jerky motion;
    motor speed sensing means for producing signals representative of the speed of said motor:
        differencing means including a noninverting input port coupled to said source of operator-controlled commanded torque signals and also including an inverting input port, for subtracting signal applied to said inverting input port from said commanded torque signals, for generating said torque command signals; and
        damping signal generating means coupled to said motor speed sensing means and to said inverting input port of said differencing means, for coupling to said inverting input port of said differencing means at least the low-frequency components of motor acceleration.

2. A vehicle according to claim 1, wherein said gearbox is a differential including a second output shaft, and said vehicle further comprises a second drive wheel, and a second axle coupling said second drive wheel to said second output shaft of said differential.

3. A motor vehicle according to claim 1, comprising:
    a source of electric energy;
    an electric motor including an output shaft;
    a source of operator-controlled commanded torque signals;
    a control system coupled to said source of electric energy, to said electric motor, and to receive torque command signals, for controlling said motor to produce the commanded torque at said output shaft of said motor;
    a mechanical gearbox including an input shaft coupled to said shaft of said motor and also including an output shaft, for reducing the input shaft speed to produce a lower output shaft speed, with a concomitant increase in the output shaft torque;
    a drive wheel for supporting and driving said vehicle;
    an elongated axle shaft coupled to said drive wheel and to said output shaft of said gearbox, for thereby coupling torque to said drive wheel from said gearbox, said axle shaft having a stiffness which, in conjunction with the mass of said vehicle, tends to produce undesired jerky motion;
    motor speed sensing means for producing signals representative of the speed of said motor;
    differencing means including a noninverting input port coupled to said source of operator-controlled commanded torque signals and also including an inverting input port, for subtracting signal applied to said inverting input port from said commanded torque signals, for generating said torque command signals; and
    damping signal generating means coupled to said motor speed sensing means and to said inverting input port of said differencing means, for coupling to said inverting input port of said differencing means at least the low-frequency components of motor acceleration, wherein said damping signal generating means comprises an infinite-impulse-response transversal filter including an input port coupled to said motor speed sensing means, for receiving said motor speed signals, for generating said damping signals.

4. A motor vehicle, comprising:
    a source of electric energy;
    an electric motor including an output shaft;
    a source of operator-controlled commanded torque signals;
    a control system coupled to said source of electric energy to said electric motor, and to receive torque command signals, for controlling said motor to produce the commanded torque at said output shaft of said motor;
    a mechanical gearbox including an input shaft coupled to said shaft of said motor and also including an output shaft, for reducing the input shaft speed to produce a lower output shaft speed, with a concomitant increase in the output shaft torque;
    a drive wheel for supporting and driving said vehicle;
    an elongated axle shaft coupled to said drive wheel and to said output shaft of said gearbox, for thereby coupling torque to said drive wheel from said gearbox, said axle shaft having a stiffness which, in conjunction with the mass of said vehicle, tends to produce undesired jerky motion;
    motor speed sensing means for producing signals representative of the speed of said motor;
    differencing means including a noninverting input port coupled to said source of operator-controlled commanded torque signals and also including an inverting input port, for subtracting signal applied to said inverting input port from said commanded torque signals, for generating said torque command signals; and
    damping signal generating means coupled to said motor speed sensing means and to said inverting input port of said differencing means, for coupling to said inverting input port of said differencing means at least the low-frequency components of motor acceleration, said damping signal generating means comprising an infinite-impulse-response transversal filter including an input port coupled to said motor speed sensing means, for receiving said motor speed signals, for generating said damping signals;
    wherein said infinite-impulse-response filter comprises:

a delay stage including an input node coupled to receive said motor speed signals, and also including an output port at which delayed motor speed signals appear;

a first summing circuit including an inverting input port and a noninverting input port, and an output port at which the difference between the signals applied to said inverting and noninverting input ports is generated;

a second summing circuit including an inverting input port, and also including a noninverting input port coupled to said output port of said first summing circuit, and further including an output port at which said damping signals are generated;

a first multiplier coupled to said input node of said delay stage and to said noninverting input port of said first summing circuit, for coupling said motor speed signals from said node to said noninverting input port of said first summing circuit with a particular gain;

a second multiplier coupled to said output port of said delay stage and to said inverting input port of said second summing circuit, for coupling said delayed motor speed signals from said output port of said delay stage to said inverting input port of said second summing circuit with a second gain; and a feedback path coupled to said output port of said second summing circuit and to said inverting input port of said first summing circuit, said feedback path including a delay stage and a third multiplier for multiplying feedback signals traversing said feedback path by a third gain.

5. A vehicle according to claim 4, wherein said second gain equals said particular gain.

* * * * *